United States Patent
Adkins et al.

(10) Patent No.: US 9,569,631 B2
(45) Date of Patent: Feb. 14, 2017

(54) METHOD AND APPARATUS FOR CONFIGURING AN ELECTRONICS DEVICE

(75) Inventors: Christopher Alan Adkins, Lexington, KY (US); Stephen Porter Bush, Richmond, KY (US); Mark Walter Fagan, Lexington, KY (US); Duane Edward Norris, Richmond, KY (US); Douglas Keith Perterson, Jr., Irvine, KY (US); Thomas James Wack, Nicholasville, KY (US); Gregory Scott Woods, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 483 days.

(21) Appl. No.: 13/149,726

(22) Filed: May 31, 2011

(65) Prior Publication Data

US 2012/0192293 A1    Jul. 26, 2012

Related U.S. Application Data

(60) Provisional application No. 61/435,251, filed on Jan. 21, 2011.

(51) Int. Cl.

| | |
|---|---|
| *G06F 21/60* | (2013.01) |
| *G06F 21/64* | (2013.01) |
| *H04L 12/24* | (2006.01) |
| *H04N 1/00* | (2006.01) |
| *H04N 1/44* | (2006.01) |
| *H04L 29/08* | (2006.01) |
| *H04L 9/32* | (2006.01) |
| *G06F 15/177* | (2006.01) |

(52) U.S. Cl.
CPC .............. *G06F 21/606* (2013.01); *G06F 21/64* (2013.01); *H04L 41/0813* (2013.01); *H04L 41/28* (2013.01); *H04L 67/125* (2013.01); *H04N 1/00973* (2013.01); *H04N 1/4433* (2013.01); *G06F 2221/2101* (2013.01); *G06F 2221/2153* (2013.01); *H04N 2201/0094* (2013.01)

(58) Field of Classification Search
CPC ...... H04L 63/08; H04L 9/3247; H04L 63/123; H04L 9/32; G06F 21/31; G06F 9/44505; G06F 15/177; G06F 17/30477; H04W 12/06; H04N 1/00278
USPC ........ 709/220, 224; 713/100, 150, 164, 168, 713/188, 189, 1, 176; 718/1, 100; 726/1–26, 726/28–30, 34; 358/1.1
See application file for complete search history.

(56) References Cited

U.S. PATENT DOCUMENTS

| | | | | |
|---|---|---|---|---|
| 6,158,837 | A * | 12/2000 | Hilton ................ | B41J 2/17546 347/19 |
| 6,167,521 | A * | 12/2000 | Smith et al. ................ | 726/21 |
| 8,312,431 | B1 * | 11/2012 | Moffat et al. ................ | 717/126 |

(Continued)

*Primary Examiner* — Tae Kim
*Assistant Examiner* — Shiuh-Huei Ku

(57) ABSTRACT

A method and apparatus for configuring an electronics device. The method includes receiving, by the electronics device, a request for a command to perform a predetermined operation by the electronics device and sending the command in response to receiving the request. The electronics device then receives a signature based upon the command, whereupon the electronics device verifies the signature by the electronics device and, following an affirmative verification, executes the command for performing the predetermined operation. In this way, the electronics device may be reconfigured remotely without knowledge of the particular command for performing the predetermined operation by the electronics device.

28 Claims, 2 Drawing Sheets

(56) References Cited

U.S. PATENT DOCUMENTS

| | | | |
|---|---|---|---|
| 8,312,523 B2* | 11/2012 | Geller | 726/8 |
| 8,533,311 B2* | 9/2013 | Chiu | H04L 29/06 709/206 |
| 2005/0074126 A1* | 4/2005 | Stanko | H04L 63/0807 380/279 |
| 2007/0201926 A1* | 8/2007 | Kato | G06F 3/1208 400/62 |
| 2010/0275026 A1* | 10/2010 | McLean | 713/176 |
| 2012/0066746 A1* | 3/2012 | Larsen | G06F 21/629 726/4 |
| 2012/0291030 A1* | 11/2012 | Fitzgerald et al. | 718/1 |

* cited by examiner

METHOD AND APPARATUS FOR CONFIGURING AN ELECTRONICS DEVICE

CROSS REFERENCES TO RELATED APPLICATIONS

Pursuant to 35 U.S.C. 119, the present application is related to and claims benefit from U.S. patent application No. 61/435,251, filed Jan. 21, 2011, entitled "Secure Signing of Configuration Commands and Method for an Electronics Device," the content of which is hereby incorporated by reference herein in its entirety.

BACKGROUND

1. Technical Field

The present application relates generally to configuring or reconfiguring characteristics of an electronics device, and more particularly to securely configuring the electronics device without knowledge of the configuration command therefor.

2. Description of the Related Art

Today's electronics devices are sophisticated machines, performing numerous operations oftentimes through use of a controller executing embedded firmware. There are times when it is desired to change specific sensitive settings in an electronics device in a secured and controlled fashion in order to protect the device from unauthorized attacks by hackers. In the case of an imaging device such as a printer, it may be desirous to change the region setting or cartridge set that is accepted by the printer. Due to the advanced state of reverse engineering, storing a symmetric key or private key on the printer or on a client machine's disk greatly reduces the complexity involved in stealing the key. Therefore, a secure signing system should be put in place in order to protect the stored key(s). Flexibility and additions drive additional cost in new infrastructure or in the printer's components. In this specific case, adding a new printer model/Network Protocol Alliance (NPA) command would require an infrastructure change.

In protocols commonly used today, a piece of data is signed by one party and then verified by another party in order to be authentic. In this case, both parties need to know the data that is being transferred. For example, a printer (the device) may be initially configured to be a printer for a first OEM customer and therefore only accept cartridges from the first OEM. To change that printer to accept cartridges from a different OEM customer, a command (xxyyzz) is sent to the printer. To verify that the command is valid and sent from a known source, the command is signed and then sent to the printer using a private and public key pair. Upon reception of the signature, the printer then verifies the validity of the signature and changes its configuration to accept different OEM cartridges.

To further improve the security, the printer's unique serial number can be used which binds the signature to only that specific printer. To perform this operation, the signing party must know the command that the printer accepts and read the serial number from the printer. This requires knowledge of the commands the printer accepts and how to read the serial number. Specifically, knowledge of what data is to be changed, the new data values and the command to perform the change are necessary for each particular configuration capable of being changed. For a number of different models of devices provided by a manufacturer, the knowledge necessary to be able to suitably configure each device of each device model becomes a significant undertaking.

Based upon the foregoing, there is a need for an improved process for configuring an electronics device, such as a printer.

SUMMARY

Example embodiments overcome shortcomings experienced in prior configuration techniques and thereby satisfy a need for a process for effectively altering the operation of an electronics device. Example embodiments are relatively simple in operation and inexpensive to implement.

In accordance with an example embodiment, there is disclosed a process for performing a predetermined operation in an electronics device, including receiving, by the electronics device, a request for a command to perform the predetermined operation, and sending the command in response to receiving the request. The process further includes subsequently receiving, by the electronics device, a signature based upon the command, verifying the signature by the electronics device, and executing the command for performing the predetermined operation. By requesting from the electronics device the particular command to perform the predetermined operation, the system requesting the command can advantageously effectuate the predetermined operation being performed by the electronics device without maintaining the particulars of the command set executable thereby. Providing a signature for the command for verification by the electronics device assures the command executed by the electronics device was sent from a secure, trusted source.

In another example embodiment, there is disclosed a method for performing a predetermined operation in an electronics device, including sending a request to the electronics device for a command for execution by the electronics device to perform the predetermined operation, the request being common to a plurality of different types of electronic devices in a communication network; receiving the command from the electronics device; generating a signature based upon the received command; and sending the command and the signature to the electronics device for execution thereby. By having the request common to any electronics device in the communications network, the device requesting that the predetermined operation be performed advantageously avoids the need to know the command set of each electronics device in the network, thereby simplifying the tasks by requesting the device to sign the commands received by the electronics devices responsive to sending the common request.

BRIEF DESCRIPTION OF THE DRAWINGS

The above-mentioned and other features and advantages of the various embodiments, and the manner of attaining them, will become more apparent and will be better understood by reference to the accompanying drawings, wherein.

DETAILED DESCRIPTION

Figure 1:
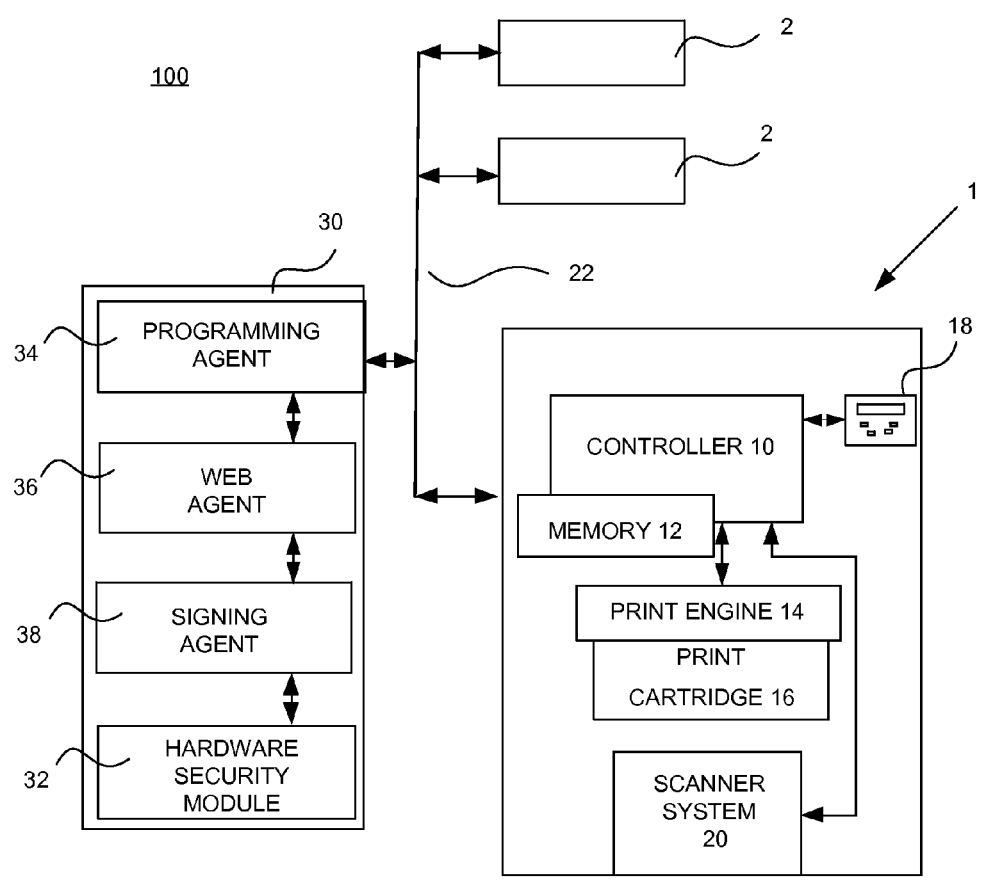
FIG. 1 is a block diagram of a communications network according to an example embodiment.

The following description and drawings illustrate embodiments sufficiently to enable those skilled in the art to practice it. It is to be understood that the subject matter of this application is not limited to the details of construction and the arrangement of components set forth in the following description or illustrated in the drawings. The subject matter is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present application as defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

With reference to FIG. 1, there is shown a system or network 100 according to an example embodiment. System 100 includes at least one electronics device 1. Electronics device 1 may be any electronics device having one or more reconfigurable operating characteristics or parameters.

Electronics device 1 may include a controller 10 for executing code, such as firmware maintained in embedded memory 12, to control modules or sub-systems of electronics device 1. In an example embodiment, electronics device 1 is an imaging device such as a printer or multifunction printing device. In this embodiment, such modules and sub-systems may include a print engine 14 and a replaceable print cartridge 16 for imparting images onto sheets of media. In an inkjet printer, print engine 14 may include a printhead which is controlled to jet droplets of ink, stored in print cartridge or bottle 16, onto a media sheet to create the printed image. Conversely, in a laser printer, print engine 14 may include a laser scan unit and one or more imaging stations to place toner particles, maintained in print cartridge or bottle 16, onto the media sheet to form the printed image. Print engines 14 and print cartridges 16 used in both inkjet and laser based printers are well known such that a detailed description thereof will not be included herein for reasons of simplicity. It is understood that, alternatively, print engine 14 may utilize technologies other than or in addition to inkjet and laser based technologies.

Electronics device 1 may further include a user interface 18 for communicating information between electronics device 1 and a user thereof. User interface 18 may be controlled by controller 10. User interface 18 may include, for example, a touch screen for both receiving user input and displaying information to the user, as is known in the art. It is understood that, alternatively, user interface 18 may utilize other mechanisms for receiving user information from and providing information to a user.

In the example embodiment in which electronics device 1 is a multifunction printing device, electronics device 1 may further include a scan system 20, controlled by controller 10, for capturing images appearing on sheets of media.

System 100 may further include a server or host computer 30 which communicates with electronics device 1 over network through use of interface 22. Interface 22 may be a wired or wireless interface, and may be secure. Server 30 may communicate with other electronic devices 2 in the network via interface 22 or other communication interfaces. Electronic devices 2 may be the same type of device as electronics device 1 or different therefrom. The network in which server 30 and electronics device 1 communicate may be a local area network, wide area network, local connection (i.e., USB or serial) or the like. In general terms, server 30 may perform any of a number of services for electronic devices 1 and 2 coupled thereto, such as monitoring and managing device operation so that the electronics devices communicatively coupled to server 30 perform as desired. Server 30 may run on one or more physical computers in the network.

Server 30 may include a number of modules and/or agents in order to provide various services to electronics devices 1 communicatively coupled to server 30. In an example embodiment, server 30 may include modules and/or agents for changing or reconfiguring one or more operating characteristics, parameters or settings, hereinafter referred to as "characteristics," of each electronics device 1. The operating characteristic of electronics device 1 available for changing or reconfiguring may be any of a number thereof. For example, in connection with the example embodiment in which electronics device 1 is a printer, the reconfigurable operating characteristic may be the identification of the type of print cartridge or cartridges 16 that electronics device 1 may accept. In another example, the reconfigurable characteristic may be in electronics device 1 accepting unsigned widgets so that widget developers for electronics device 1 may create and test widgets without signing for them each time a widget is to be downloaded and tested in electronics device 1. As mentioned above, modules and/or agents of server 30 may change or reconfigure virtually any operating characteristic associated with electronics device 1.

Because some operating characteristics of electronics device 1 that may be desired to be changed or reconfigured may include sensitive device settings, the ability to change or reconfigure the device characteristics in a secure manner is important. Due to the advanced state of reverse engineering, storing a symmetric key or private key in electronics device 1 substantially reduces the complexity required in order to steal the key. Accordingly, example embodiments of the present disclosure provide secure key storage and utilize a secure signing system in order to protect keys of electronics device 1.

An example embodiment of the present disclosure may include a hardware security module (HSM) 32 which protects the private keys of electronics devices 1. Because incorporating HSM 32 into electronics device 1 may not be cost effective, HSM 32 may instead be included in server 30. By including HSM in server 30, a secure infrastructure is thereby included that provides a secure communications channel between electronics device 1 and HSM 32. The present system 100 may provide a public asymmetric key in electronics device 1 and a private asymmetric key in HSM 32 so as to substantially reduce key theft.

With continued reference to FIG. 1, the secure infrastructure of system 100, and server 30 in particular, may further include a programming agent 34. Programming agent 34 serves as the communication module for communicating with server 30 by electronics device 1 and other electronic devices. For example, programming agent 34 may send query commands to one or more electronics devices, including electronics device 1, requesting commands for changing or reconfiguring one or more operational characteristics of such devices. Programming agent 34 may also securely communicate with other modules and agents in or otherwise associated with server 30 for forwarding the commands received from electronic devices and returning commands and related signatures thereto.

Server 30 may further include a web agent 36 which securely receives commands from programming agent 34 for signing, validates the commands, securely sends the validated commands for signing, and securely returns the commands and their corresponding signatures to programming agent 34.

Server 30 may further include a signing agent 38. Signing agent 38 operates in conjunction with HSM 32 for generating signatures. In particular, signing agent 38 may log received, validated commands with audit data, securely forward the received, validated commands to HSM 32 for signing, and securely return received signatures to web agent 36.

It is understood that the functions performed by programming agent 34, web agent 36 and signing agent 38 may be included in a fewer number of agents, or further divided into a greater number of agents, than described above, depending upon the particular application.

In accordance with example embodiments of the present disclosure, controller 10 of electronics device 1 is configured to receive and respond to a query command from server 30 that is common to electronic devices that communicate with server 30. In particular, the common query command sent by programming agent 34 may inform electronics device 1 what action is desired of electronics device 1, such as changing or reconfiguring an operating characteristic thereof. In response, electronics device 1 sends the particular command that performs the desired action to programming agent 34. By using a common query command, server 30 according to example embodiments advantageously avoids the need to keep track of the commands that are acceptable by each electronics device 1 in order to reconfigure parameters in each. As a result, server 30 may efficiently monitor and/or manage the operation of many different types of electronics devices that are coupled thereto.

Figure 2:
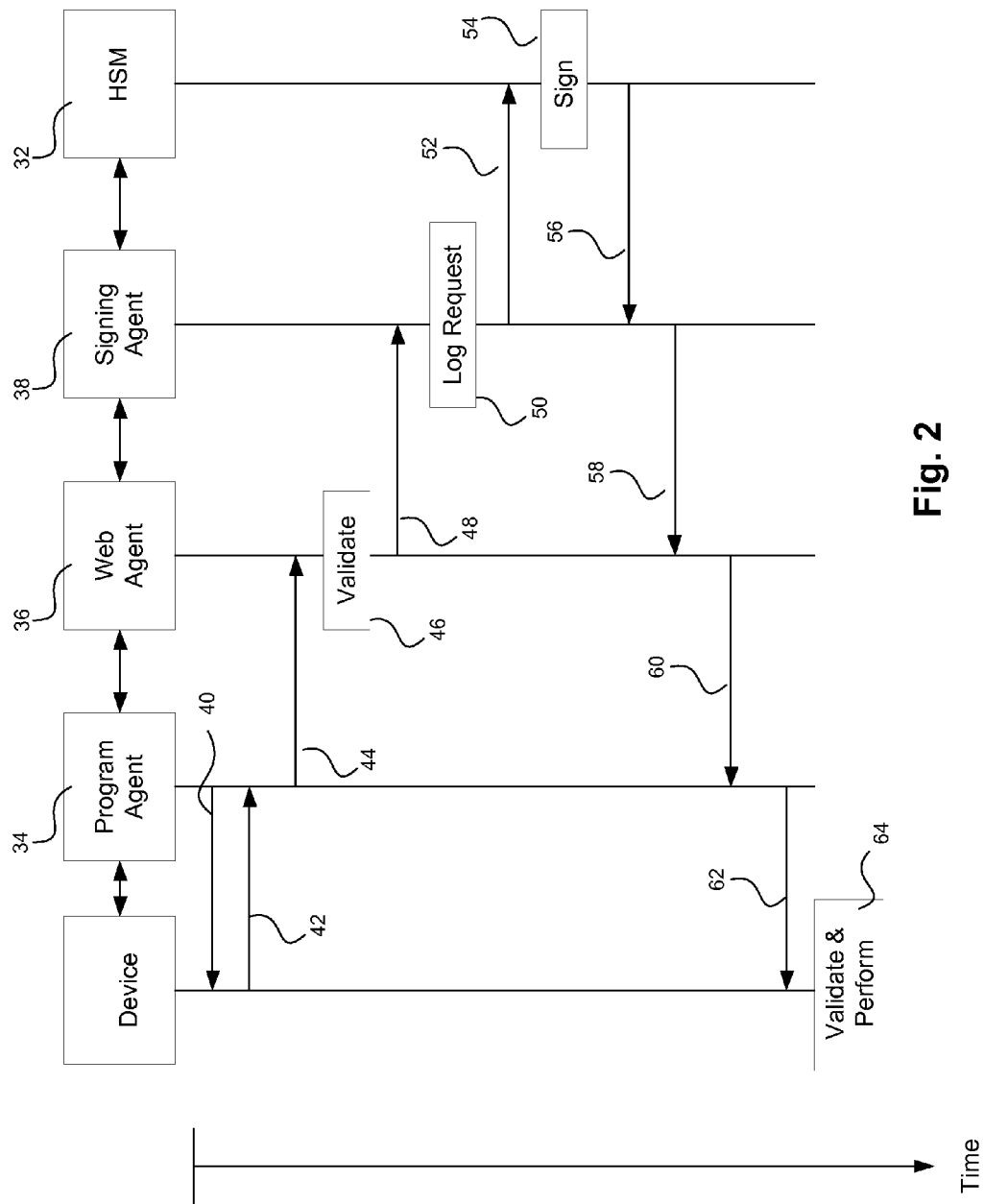
FIG. 2 is a signal diagram illustrating signal communications between components of the system of FIG. 1.

The operation of system 100 in securely changing a characteristic within an electronics device 1 will be described with reference to FIG. 2. Initially, a determination is made that an operating characteristic of electronics device 1 needs to be changed, and a query is sent at 40 by programming agent 34 to electronics device 1. As stated above, the query is common to all or substantially all electronics devices which communicate with server 30, and identifies the particular action electronics device 1 is tasked to undertake. In response, electronics device 1 builds a command that electronics device 1 would execute in order to perform the desired action and sends the command at 42 to programming agent 34. The command may also include an identifier that is unique to electronics device 1 so that the command cannot be executed on another electronics device. The unique identifier may be, for example, the MAC address of the electronics device, the device's serial number or the serial number of a chip contained within electronics device 1. The command may include additional data for effectuating the change, such as the data value for the to-be-changed characteristic.

Upon receiving the command from electronics device 1, programming agent 34 securely sends the command to web agent 36 at 44. Web agent 36 validates the command at 46 and sends the command to signing agent 38 at 48. Signing agent 38 may log the command at 50 with audit data in a log file or database. Thereafter, signing agent 38 may securely send the command to HSM 32 at 52 at which point HSM 32 signs the command at 54.

At 56, HSM 32 securely sends the command and its signature to signing agent 38. Signing agent 38 thereupon sends the command and signature to web agent 36 at 58, which forwards the command and signature to programming agent 34 at 60. Programming agent 34 sends at 62 the command and its signature to electronics device 1. Following reception of the command and corresponding signature, electronics device 1 evaluates the command and validates the signature with the data and the unique identifier of electronics device 1. Upon an affirmative evaluation and validation, electronics device 1 executes the command, thereby taking the desired action, such as changing a particular operating characteristic of electronics device 1.

As is understood, the particular command generated by electronics device 1 in response to receiving the common query command may not be common to other electronic devices communicatively coupled to server 30. In addition, the particular command for performing the desired action may contain a unique identifier which restricts usage of the command to the particular electronics device 1.

The foregoing description of multiple embodiments has been presented for purposes of illustration. It is not intended to be exhaustive or to limit the application to the precise forms disclosed, and obviously many modifications and variations are possible in light of the above teaching. It is understood that the subject matter of the present application may be practiced in ways other than as specifically set forth herein without departing from the scope and essential characteristics. It is intended that the scope of the application be defined by the claims appended hereto.

What is claimed is:

1. A method for executing a command in an electronics device, comprising:

receiving, by the electronics device, a query, from an apparatus distinct from the electronics device, for a command executable by the electronics device to change at least one operating characteristic of the electronics device, the command to be later executed by the electronics device;

sending, by the electronics device, the command to the apparatus in response to receiving the query;

receiving, by the electronics device, the command and a signature based upon the command from the apparatus;

verifying the signature by the electronics device; and executing, by the electronics device, the command, wherein the electronics device is one of a printer and a multi-function printer (MFP) and wherein the at least one operating characteristic is an operating characteristic associated with a printing operation by the electronics device.

2. The method of claim 1, wherein the sending the command includes sending an identifier unique to the electronics device, wherein the signature is based upon the identifier.

3. The method of claim 1, wherein the command includes an identifier unique to the electronics device and data corresponding to the at least one operating characteristic of the electronics device to be changed, the sending the command includes sending the identifier and the data, and the signature is based upon the identifier and the data.

4. The method of claim 1, wherein the command comprises changing a type of print cartridge operable with the electronics device.

5. The method of claim 1, wherein the command comprises changing software code the electronics device is allowed to receive via download of unsigned software code.

6. The method of claim 1, wherein the sending the command includes sending an identifier unique to the electronics device, verifying the signature comprises verifying the signature based upon the identifier, and executing the command is performed upon the signature being affirmatively verified.

7. The method of claim 1, further comprising evaluating, by the electronics device, the command, wherein the sending the command is performed upon completion of a valid evaluation.

8. A method for performing a predetermined operation in an electronics device, comprising:
sending, by an apparatus, a query to the electronics device for receiving by the apparatus in reply a command executable by the electronics device for later execution by the electronics device to change at least one operating characteristic of the electronics device, the apparatus being distinct from the electronics device, and the query being common to a plurality of different types of electronic devices;
receiving, by the apparatus, the command sent by the electronics device;
generating a signature based upon the received command; and
sending the command and the signature to the electronics device for execution thereby,
wherein the electronics device is a printing device and wherein the at least one operating characteristic is an operating characteristic associated with an operation by the printing device.

9. The method of claim 8, wherein the receiving the command further comprises receiving an identifier corresponding to the electronics device, and the generating the signature comprises generating the signature based upon the identifier.

10. The method of claim 8, further comprising validating the command prior to generating the signature.

11. The method of claim 8, wherein the receiving the command further comprises receiving an identifier corresponding to the electronics device and data, and the generating the signature is based upon the identifier and the data, the data corresponding to a value associated with the at least one operating characteristic.

12. The method of claim 8, wherein the command is dependent upon a type of the electronics device and not maintained in the apparatus following the sending to the electronics device.

13. The method of claim 8, further comprising:
sending the query to a second electronics device for a second command for execution thereby to change the at least one operating characteristic of the second electronics device;
receiving the second command sent by the second electronics device;
generating a second signature based upon the received second command; and
sending the second command and the second signature to the second electronics device for execution thereby.

14. An electronics device, comprising:
a controller configured to perform a plurality of operations, the controller executing program code stored in memory for:
receiving, at an interface of the electronics device, a query from an apparatus, distinct from the electronics device, the query for the electronics device to send to the apparatus a command that is executable by the controller for changing at least one operating characteristic of the electronics device when executed thereby;
sending, by the interface, the command to the apparatus in response to the receiving the query;
following the sending, receiving by the interface a signature from the apparatus based upon the command;
verifying the signature; and
executing, by the electronics device, the command,
wherein the electronics device is a printer or a multi-function printer (MFP) and wherein the at least one operating characteristic is an operating characteristic relating to an operation by the printer or multi-function printer.

15. The electronics device of claim 14, wherein the controller sends an identifier unique to the electronics device when sending the command, wherein the signature is based upon the identifier.

16. The electronics device of claim 14, wherein the query includes an identifier unique to the electronics device and data corresponding to the at least one operating characteristic to be changed by the electronics device, the sending the command includes sending the identifier and the data, and the signature is based upon the identifier and the data.

17. The electronics device of claim 14, wherein the command corresponds to changing a type of print cartridge operable with the electronics device.

18. The electronics device of claim 14, wherein the controller executes the command upon the signature being affirmatively verified.

19. The electronics device of claim 14, wherein the controller evaluates the query and sends the command upon an affirmative evaluation.

20. The method of claim 1, wherein the command includes changing one or more print operation settings of the electronics device.

21. The method of claim 8, wherein the command includes changing at least one of a print cartridge operable with the electronics device.

22. The electronics device of claim 14, wherein the command includes changing a print cartridge operable with the electronics device.

23. The method of claim 1, further comprising:
receiving, by a second electronics device from the apparatus, the query for the command to be executed by the second electronics device for changing the at least one operating characteristic thereof; and
sending, by the second electronics device, a second command to the apparatus in response to receiving the query thereby, the second command being different from the first command, the electronics device and the second electronics device using different commands for changing their respective at least one operating characteristic.

24. The method of claim 1, wherein the apparatus comprises a server.

25. The method of claim 8, further comprising:
sending, by the apparatus, the query to a second electronics device distinct from the electronics device for the command to be executed by the second electronics device for changing the at least one operating characteristic of the second electronics device; and
receiving, by the apparatus, a second command sent by the second electronics device in response to the receiving the query thereby, the second command being different from the first command such that the electronics device and the second electronics device use different commands for changing their respective at least one operating characteristic.

26. The method of claim 8, wherein the apparatus comprises a server.

27. The electronics device of claim 14, wherein the apparatus comprises a server.

28. The method of claim 1, wherein sending the command is performed without the electronics device executing the command.

* * * * *